Sept. 15, 1959          M. FOX          2,903,816
AMUSEMENT DEVICE
Filed Jan. 9, 1959
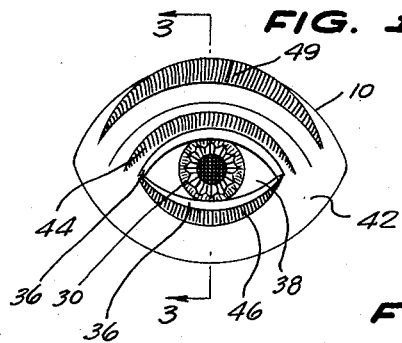
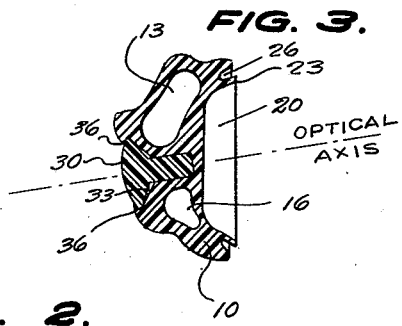
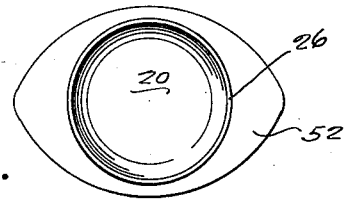
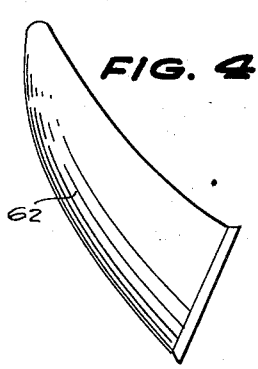
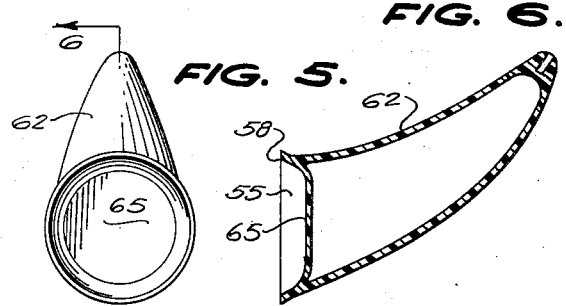
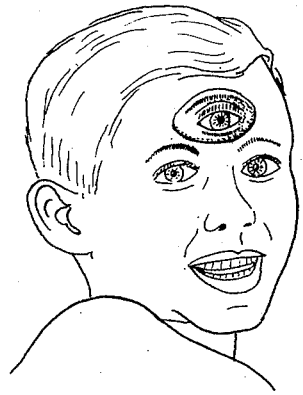
INVENTOR.
MORRIS FOX,
BY
Albert Zalkind
ATTORNEY.

United States Patent Office 2,903,816
Patented Sept. 15, 1959

2,903,816

AMUSEMENT DEVICE

Morris Fox, Brooklyn, N.Y.

Application January 9, 1959, Serial No. 785,879

3 Claims. (Cl. 46—1)

This invention relates to amusement and novelty devices and more particularly to a device for attachment to human skin in order to simulate an abnormal feature as part of an individual.

It is an objective of my invention to provide an amusement device which will be simple to apply to human skin without the need for adhesives, rubber bands, etc.

It is another object of the invention to provide a device which will realistically simulate an abnormal growth or comic feature.

It is a further object of my invention to provide a device which may be economically manufactured.

It is a still further object of my invention to provide a device which may be applied to the body without the need for any prior preparation, experimentation, or instructions other than those of a most elementary nature.

Briefly, my invention comprises the integral molding of a suction cup with a comic feature such as an eye or a horn, whereby the suction cup may be pressed against the skin for adherence thereto so as to support and maintain the feature in erect and natural position, for example, with respect to the face of the wearer, and preferably on the forehead. The devices disclosed herein are made of a soft, plastic material, or even of rubber, in such a manner as to be safe and harmless and readily applied to the skin with a minimum of pressure and effort.

A detailed description of the invention will now be given in conjunction with the appended drawing in which:

Fig. 1 is a full front view of one form of the invention depicting a human eye.

Fig. 2 is a full rear view of such modification showing the suction cup.

Fig. 3 is a section through 3—3 of Fig. 1.

Fig. 4 is an elevation of another form of the invention depicting a horn.

Fig. 5 is a rear view thereof.

Fig. 6 is a section through 6—6 of Fig. 5.

Fig. 7 is a perspective of a person wearing the eye device; and

Fig. 8 is a perspective of a person wearing the horn device as a pair of horns.

Referring now to the drawings, and particularly Figs. 1 to 3 and 7, the invention comprises an eye molded of a suitably soft plastic or rubber body 10, preferably of flesh colored tones, shown in cross-section in Fig. 3, and having solid portions and hollow portions such as 13 and 16, as shown. The general configuration is such as to imitate the bulbousness of that portion of a person's features immediately surrounding an eye, showing the lid and the lashes. At the rear of the device the material is formed into a suction cup 20 having a thin and very flexible rim 23 which is separated from the main bulk of the material by the gulley or groove 26, so as to provide room.

The rim 23 may be expanded radially when pressed against a person's skin. Thus, by making the rim 23 thin and flexible, a minimum of effort is required in applying the suction cup and a minimum of mechanical stress is exerted by the suction cup on the skin. The forward portion of the device is provided with a button eye 30 of plastic, which is received in a cavity 33 provided in the material of the body 10 at the time of molding. An overhanging ledge 36 is formed at the outer end of the cavity to securely lock the eye member 30 peripherally, which eye member is suitably molded so as to depict a pupil and iris, as shown in Fig. 1. The surface 38 of the body 10 surrounding the eye member 30 is colored white so as to represent the white of an eye, while the front surface 42 of the body 10 is of flesh-colored plastic. Lashes such as 44 and 46 are simulated by suitable molding of the integral body 10 along with a surface 49 representing a brow. The lashes and brow are colored as by painting or any other suitable manner, with a dark pigment so as to effect realism. The rear surface 52 as shown in Fig. 2, which lies beyond the groove 26, may be plane or flat for molding simplicity, it being noted that the outer edge of rim 23 lies slightly beyond the plane of the surface 52 so as to contact the skin of a person to whom the eye is to be applied and to spread radially to a sufficient degree for adherence.

Fig. 7 shows the effect of applying the device to the forehead of a person, wherein an appearance of a third eye centrally located on the forehead is achieved.

Referring now to Figs. 4, 5, 6, and 8, a modification is disclosed consisting of a suction cup 55 having the rim 58 of thin, flexible cross-section and an integrally molded horn element 62 which is substantially a hollow body as shown in Fig. 6, which completely entraps air therein so as to have a suitable degree of rigidity for handling and for applying the suction cup to a person's skin.

From consideration of Fig. 6 the simplicity of the structure will be apparent in that a wall 65 forms the dual function of closing off the bottom of the horn, while at the same time serving as a base for the suction cup. The mode of application of the horn will be readily apparent from consideration of Fig. 8 wherein a person is shown wearing a pair of horns, one at each side of the forehead. It will be noted that both horns are of identical structure and that in view of the symmetry thereof either horn may be placed at the left or at the right, with the concavely curved portions of the horns more or less facing each other.

In order to lend realism, the novelties disclosed herein are preferably molded of flesh colored plastic. This is particularly advantageous in the case of the eye body, since it affords a "live" appearance of the eye by virtue of the ledge or locking flange 36 surrounding the eyeball with a simulated ridge of flesh depicting the inner surfaces of the eyelids. Thus, the ledge 36 is comprised of a pair of flesh simulating, crescent shaped ridges meeting at the eye corners.

While, preferably, the respective suction cups and the eye or horn bodies are integrally molded, this being an important feature of the invention, it will be apparent that separate molding of the suction cups would be possible, the cups to be subsequently attached to the feature, i.e., an eye or a horn.

Having thus described my invention I am aware that various changes may be made without departing from the spirit thereof and, accordingly, I do not seek to be limited to the precise illustration herein given except as set forth in the appended claims.

I claim:

1. A novelty device comprising an integral body of soft, flexible material, said body having an integrally molded rearward end portion formed as a suction cup having a rim of an area less than the area of the forward portions of said body, whereby when said cup is flattened for adherence it is substantially concealed peripherally by said body, the forward portions of said body being bulbously formed to simulate a natural eye and having formations comprising an eyeball, a ledge adjacent said eyeball formed to simulate an eye lid having lashes, said body having a generally centrally disposed cavity in said eyeball, and a rigid element frictionally held within said cavity depicting an eye pupil and iris.

2. A novelty device as set forth in claim 1, wherein said ledge overlaps a portion of said rigid element to lock said rigid element in said cavity.

3. A novelty device as set forth in claim 1, said body being provided with at least one hollow, interior portion.

References Cited in the file of this patent

UNITED STATES PATENTS

| | | |
|---|---|---|
| 1,645,702 | Ischinger | Oct. 18, 1927 |
| 2,219,130 | Herrmann | Oct. 22, 1940 |
| 2,310,842 | Davitt et al. | Feb. 9, 1943 |
| 2,466,278 | Rupert | Apr. 5, 1949 |
| 2,484,343 | Hawes | Oct. 11, 1949 |
| 2,536,551 | Johnson | Jan. 2, 1951 |
| 2,871,615 | Borah | Feb. 3, 1959 |

FOREIGN PATENTS

| | | |
|---|---|---|
| 152,184 | Australia | July 3, 1953 |

OTHER REFERENCES

Toys and Novelties for April 1956; page 118 cited.
Playthings for February 1958; page 139 cited.